US009649916B2

(12) United States Patent
Hamdoon et al.

(10) Patent No.: US 9,649,916 B2
(45) Date of Patent: May 16, 2017

(54) DOOR TRIM PANEL FOR ENERGY ABSORPTION

(71) Applicant: Ford Global Technologies, LLC, Dearborn, MI (US)

(72) Inventors: Muhsin M. Hamdoon, Windsor (CA); Marwan Ahmad Elbkaily, Canton, MI (US); Linh Doan, Belleville, MI (US); Jonathan Clarke, Troy, MI (US); Robert Bartus, Romulus, MI (US); Stephen Dreher, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/838,699

(22) Filed: Aug. 28, 2015

(65) Prior Publication Data

US 2017/0057330 A1    Mar. 2, 2017

(51) Int. Cl.
*B60J 5/04* (2006.01)
*B60R 13/02* (2006.01)

(52) U.S. Cl.
CPC ......... *B60J 5/0456* (2013.01); *B60R 13/0243* (2013.01)

(58) Field of Classification Search
CPC .................... B60J 5/0456; B60R 13/0243
See application file for complete search history.

(56) References Cited

U.S. PATENT DOCUMENTS

| 5,171,058 | A | * | 12/1992 | Ishikawa | B60J 5/0426 296/146.7 |
| 5,433,478 | A | | 7/1995 | Naruse | |
| 6,893,077 | B1 | | 5/2005 | DeJongh | |
| 7,237,825 | B1 | * | 7/2007 | Tilli | B60J 5/0416 296/146.7 |
| 7,503,621 | B2 | * | 3/2009 | Mani | B60R 21/0428 226/153 |
| 7,794,010 | B2 | * | 9/2010 | Saida | B60R 21/0428 296/153 |
| 7,828,388 | B2 | * | 11/2010 | Thomas | B60N 2/4235 296/1.09 |
| 8,141,934 | B2 | | 3/2012 | Benkler et al. | |
| 8,172,311 | B2 | | 5/2012 | Hughes, Jr. et al. | |
| 8,585,123 | B2 | | 11/2013 | Itou et al. | |
| 2006/0001291 | A1 | * | 1/2006 | Dooley | B60N 2/466 296/153 |
| 2007/0207292 | A1 | * | 9/2007 | Cowelchuk | B29C 45/1671 428/174 |
| 2013/0147230 | A1 | * | 6/2013 | Hirose | F16F 7/121 296/146.7 |

FOREIGN PATENT DOCUMENTS

| CN | 203698153 U | 7/2014 |
| JP | 2002046520 | 2/2002 |
| JP | 2013154662 A | 8/2013 |

* cited by examiner

*Primary Examiner* — Pinel Romain
(74) *Attorney, Agent, or Firm* — Frank MacKenzie; Bejin Bieneman PLC

(57) ABSTRACT

A door trim panel assembly includes a door trim panel and an armrest supported by the door trim panel. The armrest includes a top portion and a bottom portion each extending from the door trim panel, and a middle portion extending from the top portion to the bottom portion. The bottom portion has a wall thickness greater than a wall thickness of the top portion and greater than a wall thickness of the middle portion. The wall thickness of the top portion is less than the wall thickness of the middle portion.

15 Claims, 10 Drawing Sheets

DOOR TRIM PANEL FOR ENERGY ABSORPTION

BACKGROUND

Vehicles, such as automobiles, include body structures to absorb energy during a vehicle impact, for example, a vehicle-to-vehicle impact. During the vehicle impact, an occupant of the vehicle may become displaced and collide with one or more interior components of the vehicle creating an impact force. For example, during a side impact of the vehicle, the occupant may be forced toward an adjacent door. In this situation, the occupant may impact the armrest of the door.

When the occupant impacts the door during a vehicle impact, a pelvis of the occupant may absorb energy if the impact is localized to a pelvic area. However, if the impact occurs above the pelvis, the pelvis may absorb little or no energy and the impact may, instead, be disadvantageously absorbed by a side of the occupant, e.g., a rib cage.

The design of the door and/or other body structure are subject to several logistical constraints, such as packaging constraints, manufacturing constraints, vehicle assembly constraints, cost constraints, etc. There remains an opportunity to design a vehicle door that may localize the energy to the pelvis, absorb the energy from the side of the occupant, and satisfy these logistical constraints.

DETAILED DESCRIPTION

Figure 1:
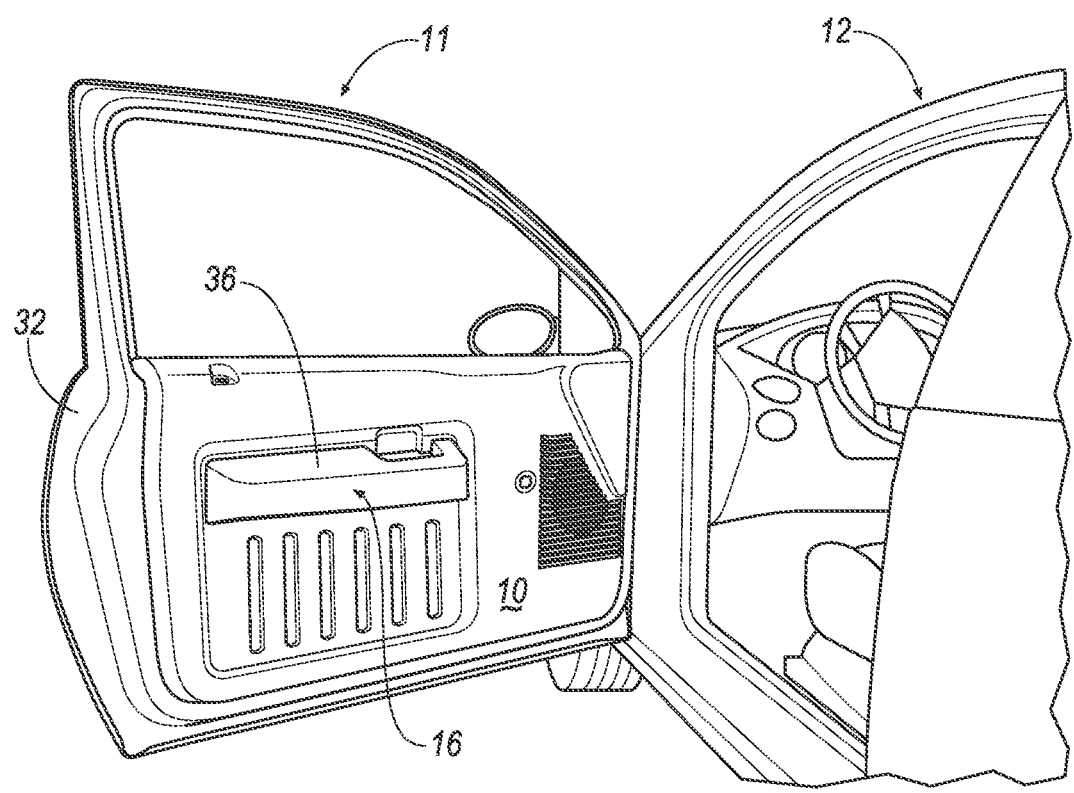
FIG. 1 is a perspective view of a vehicle including a door assembly having a door panel and a door trim panel assembly.

With reference to the Figures, wherein like numerals indicate like parts throughout the several views, a door trim panel assembly 11 for a vehicle 12 includes a door trim panel 10 and an armrest 16 supported by the door trim panel. The armrest 16 includes a top portion 18 and a bottom portion 20 that each extend from the door trim panel 10. The armrest 16 includes a middle portion 22 having a first part 52 and a second part 54. The first part 52 is part of an upper segment 40, i.e., an armrest substrate 40, and the second part 54 is integral with the door trim panel 10, as set forth further below. The middle portion 22 extends from the top portion 18 to the bottom portion 20. The bottom portion 20 has a wall thickness 24 greater than a wall thickness 26 of the top portion 18 and greater than a wall thickness 56 of the first part 52 of the middle portion 22 and a wall thickness 58 of the second part of the middle portion 22. The wall thickness 26 of the top portion 18 is greater than the wall thickness 56 and the wall thickness 58 of the middle portion 22. The wall thickness 56 of the first part 52 of the middle portion 22 is greater than the wall thickness 58 of the second part of the middle portion 22.

During a vehicle impact, an occupant 30 may impact the door trim panel 10, creating an impact force reacting against the door trim panel 10 and the occupant 30. The door trim panel 10 may absorb energy created from the occupant 30. For example, the armrest 16 of the door trim panel 10 may receive the impact force and deform and compress. This deformation and compression of the armrest 16 may absorb the energy created from the impact force. The difference in wall thickness between each of the top portion 18 and the bottom portion 20 and the middle portion 22 aids in the deformation and compression of the armrest 16 and in the absorption of the energy created from the impact force. For example, the middle portion 22 may initially receive the impact force. The wall thickness 56 and the wall thickness 58 of the middle portion 22 facilitates transfer of the energy created from the impact force to the top portion 18 and the bottom portion 20. The top portion 18 absorbs less energy than the bottom portion 20 because the wall thickness 24 of the bottom portion 20 is greater than the wall thickness 26 of the top portion 18. The impact force is focused toward, i.e., guided toward, the bottom portion 20 and the top portion 18 by the middle portion 22.

Figure 5A:
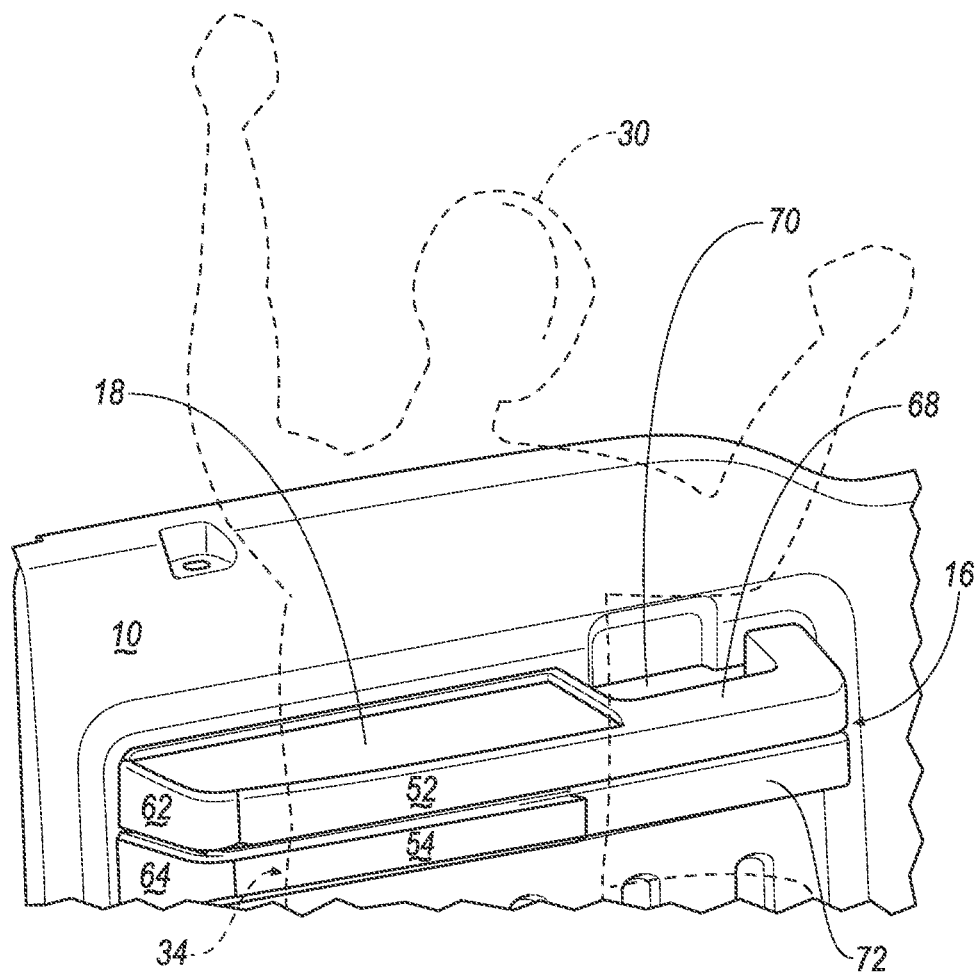
FIG. 5A is a perspective view of a portion of the door trim panel assembly before receiving an impact force.
Figure 5B:
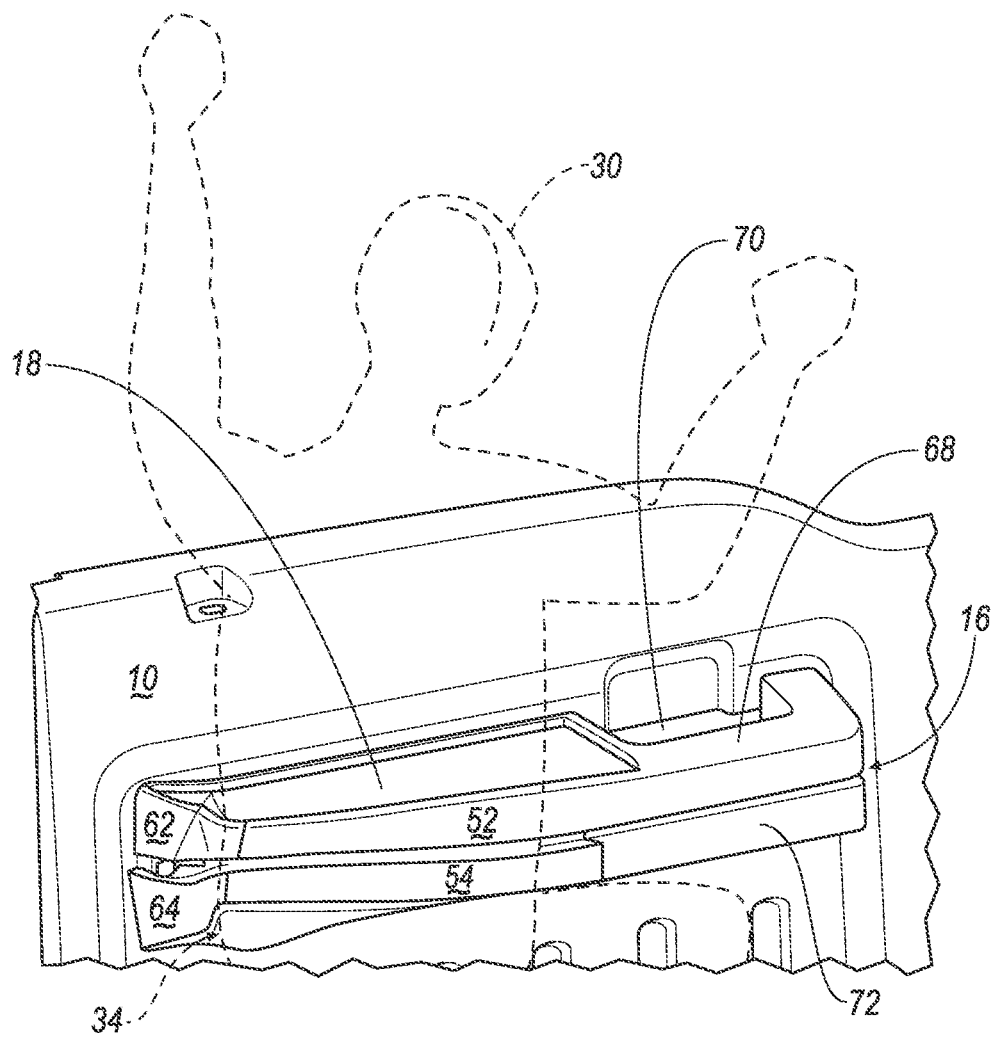
FIG. 5B is the perspective view of FIG. 5A during the application of an impact force.
Figure 5C:
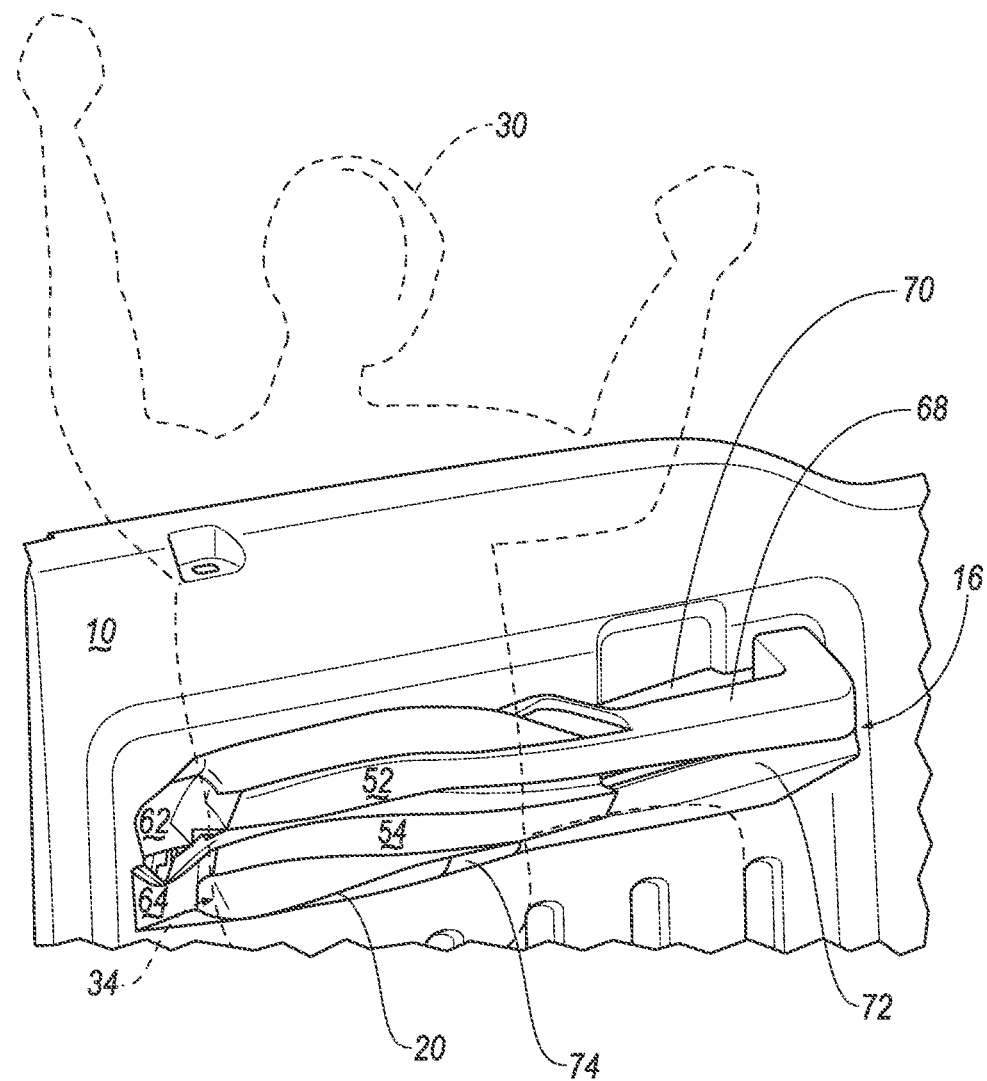
FIG. 5C is a perspective view of FIG. 5A after application of an impact force.

As best shown in FIGS. 5A-C, a pelvis of the occupant 30 may be disposed adjacent the bottom portion 20 of the armrest 16, and the top portion 18 of the armrest 16 may be disposed closer to the side and/or rib cage of the occupant 30. Since the impact force is focused toward the bottom portion 20 and the top portion 18 by the middle portion 22, the impact of the occupant 30 against the armrest 16 may be mostly absorbed by the pelvis of the occupant 30. In other words, the top portion 18 and the bottom portion 20 of the armrest 16 may crush during the impact to reduce or eliminate force transfer to the side of the occupant 30 above the pelvis.

As shown in FIG. 1, the door trim panel 10 may be a component of a door assembly of the vehicle. The door assembly may include a door panel 32 hinged to the rest of the vehicle 12. The door panel 32 may be formed of metal, for example, steel, aluminum, etc. The door panel 32 may include a door outer exposed to the environment when the door is closed and a door inner to which the door trim panel 10 is fixed.

The door trim panel 10 may be fixed to the door panel 32, e.g., a door inner of the door panel, in any suitable fashion. For example, the door trim panel 10 may include fasteners, e.g., molded in hooks, screws, Christmas tree fasteners, etc., to fix the door trim panel 10 to the door panel 32. The door trim panel 10 may be made from vinyl, plastic, foam, other polymeric materials, or any suitable material.

As shown in FIG. 1 and FIGS. 5A-C, the armrest 16 may be located on the door trim panel 10. The armrest 16 may be located at a position that is proximate to a pelvic area 34, i.e., the area of and around the pelvis, of the occupant 30. The armrest 16 may be made of any suitable material and may be made in any suitable manner. The armrest 16 may be formed by any suitable process, e.g., molding, etc.

As shown in FIG. 1, the armrest 16 may include a cover 36 supported by the top portion 18, the first part 52 of the middle portion 22. The cover 36 may be formed of any suitable material, e.g., vinyl, plastic, foam, other polymeric materials, etc. The cover 36 may provide an aesthetic appearance to the armrest 16. The cover 36 is not shown in FIGS. 3-6C to illustrate the components covered by the cover 36.

Figure 3:
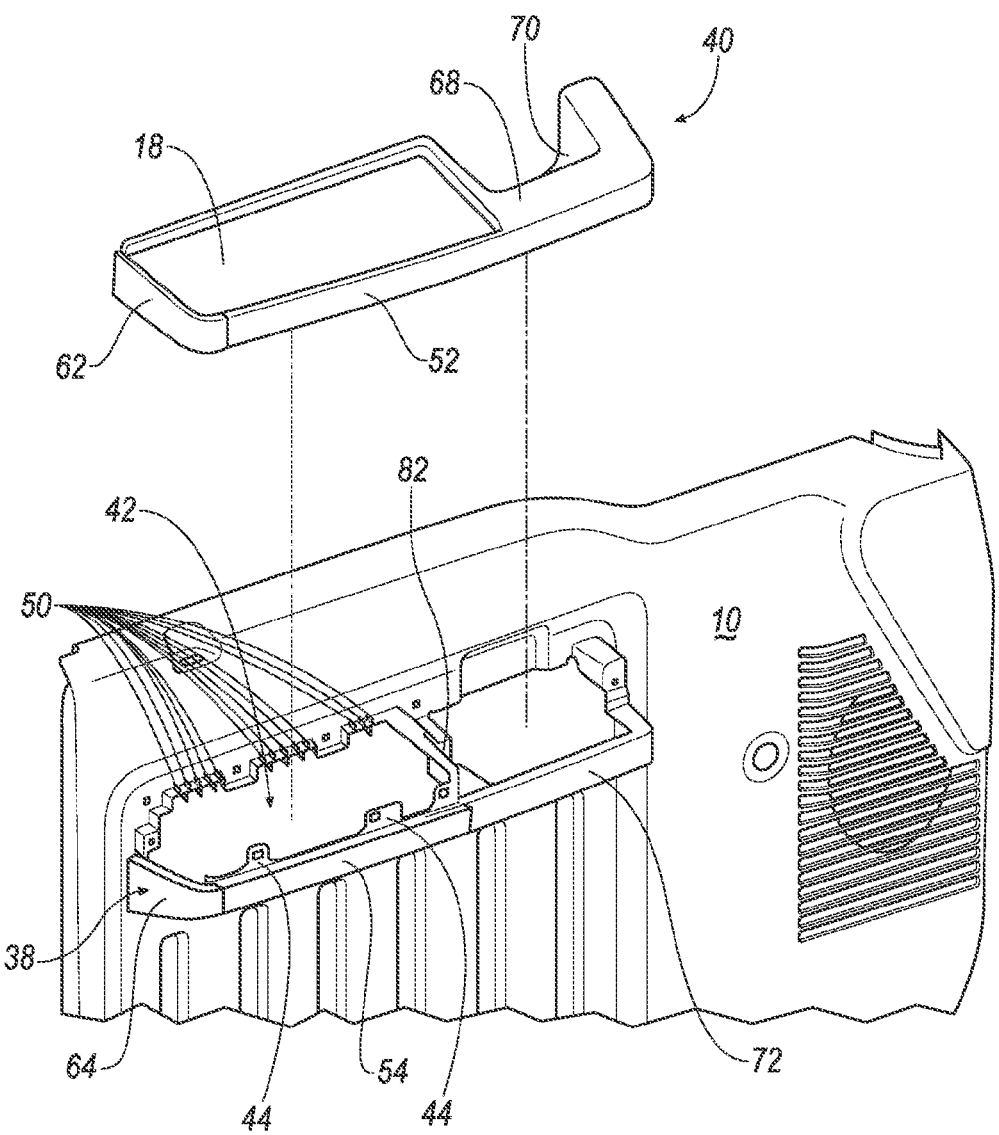
FIG. 3 is a partially exploded view of the door trim panel assembly.

As shown in FIG. 3, the armrest 16 may include a lower segment 38 and the upper segment 40. As set forth above, the upper segment 40 may be referred to as the armrest substrate. The lower segment 38 may be integral with the door trim panel 10, i.e., formed simultaneously as a single unit, with the door trim panel 10. The upper segment 40 may be formed separately from and fixed to the lower segment 38 and/or the door trim panel 10, e.g., by heat staking, fastening, welding, etc.

The lower segment 38 may be formed of the same material type as the door trim panel 10. The upper segment 40 may in part be formed of 10% talc filled polypropylene, i.e., a mixture that is substantially 90% polypropylene and substantially 10% talc.

Figure 2:
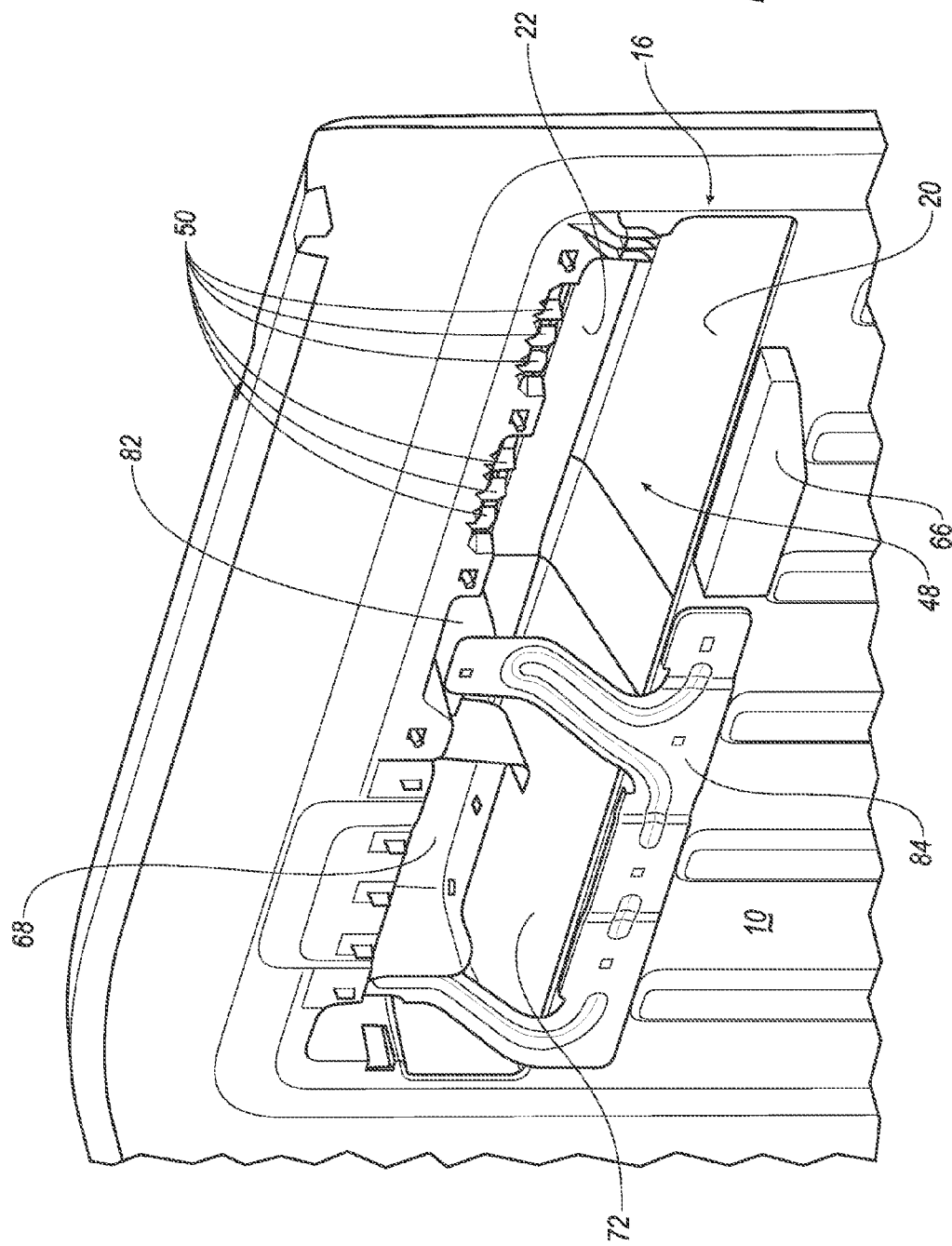
FIG. 2 is a perspective rear view of a portion of the door trim panel assembly including an armrest.

As shown in FIG. 3, the door trim panel 10 may define an opening 42. The door trim panel 10 may define flanges 44 around the opening 42. The flanges 44 may define holes that receive heat stakes fixed to the upper segment 40 to fix the upper segment 40 to the lower segment 38 to form the armrest 16. As shown in FIG. 2, the armrest 16 may be hollow. Specifically, the armrest 16 may define a cavity 48 between the upper segment 40 and the lower segment 38.

Shelves 50 extend from the door trim panel 10 and may support the upper segment 40. The shelves 50, may engage the upper segment 40. The shelves 50 may provide support for the armrest 16 in order to counteract, at least in part, a vertical load, i.e., downward force onto the upper segment 40. The shelves 50 may be arranged on any part of the door trim panel 10 and in any arrangement. The shelves 50 may be made of any suitable material and may be of any suitable length. Specifically, the shelves 50 may be 10 mm in length, e.g., expanding 10 mm from the door trim panel 10.

The bottom portion 20 may be a portion of the lower segment 38 of the armrest 16. The bottom portion 20 of the armrest 16 may extend from the door trim panel 10 toward the occupant 30 of the vehicle 12 as shown in FIG. 2 and FIGS. 5A-C. The bottom portion 20 may be integral, i.e., formed simultaneously as a single unit, with the door trim panel 10. The bottom portion 20 may extend from the door trim panel 10 at a substantially perpendicular angle. The bottom portion 20 is relatively thicker than the portions of the rest of the armrest 16, e.g., the middle portion 22 and the top portion 18. Specifically, the bottom portion 20 may have a wall thickness of 3.0-3.4 mm, e.g., 3.20 mm.

The top portion 18 may be a portion of the upper segment 40. The top portion 18 of the armrest 16 extends from the door trim panel 10 and may extend toward the occupant 30 of the vehicle 12 as shown in FIGS. 2-3 and FIGS. 5A-C. The top portion 18 may be formed of 10% talc filled polypropylene, i.e., a mixture that is substantially 90% polypropylene and substantially 10% talc. The top portion 18 may extend from the door trim panel 10 at a substantially perpendicular angle. The top portion 18 is thicker than the middle portion 22, and thinner than the bottom portion 20. Specifically, the top portion 18 may have a wall thickness of 2.25-2.65 mm, e.g., 2.45 mm.

The middle portion 22 of the armrest 16 may extend from the bottom portion 20 to the top portion 18 and may be spaced from the door trim panel 10. The middle portion 22 may extend in a direction that is substantially parallel to the door trim panel 10 or, alternatively, may extend in any suitable direction. The middle portion 22 may extend from the top portion 18 at a substantially perpendicular angle or, alternatively, at any suitable angle. Similarly, the middle portion 22 may extend from the bottom portion 20 at a substantially perpendicular angle or, alternatively, at any suitable angle.

Figure 4:
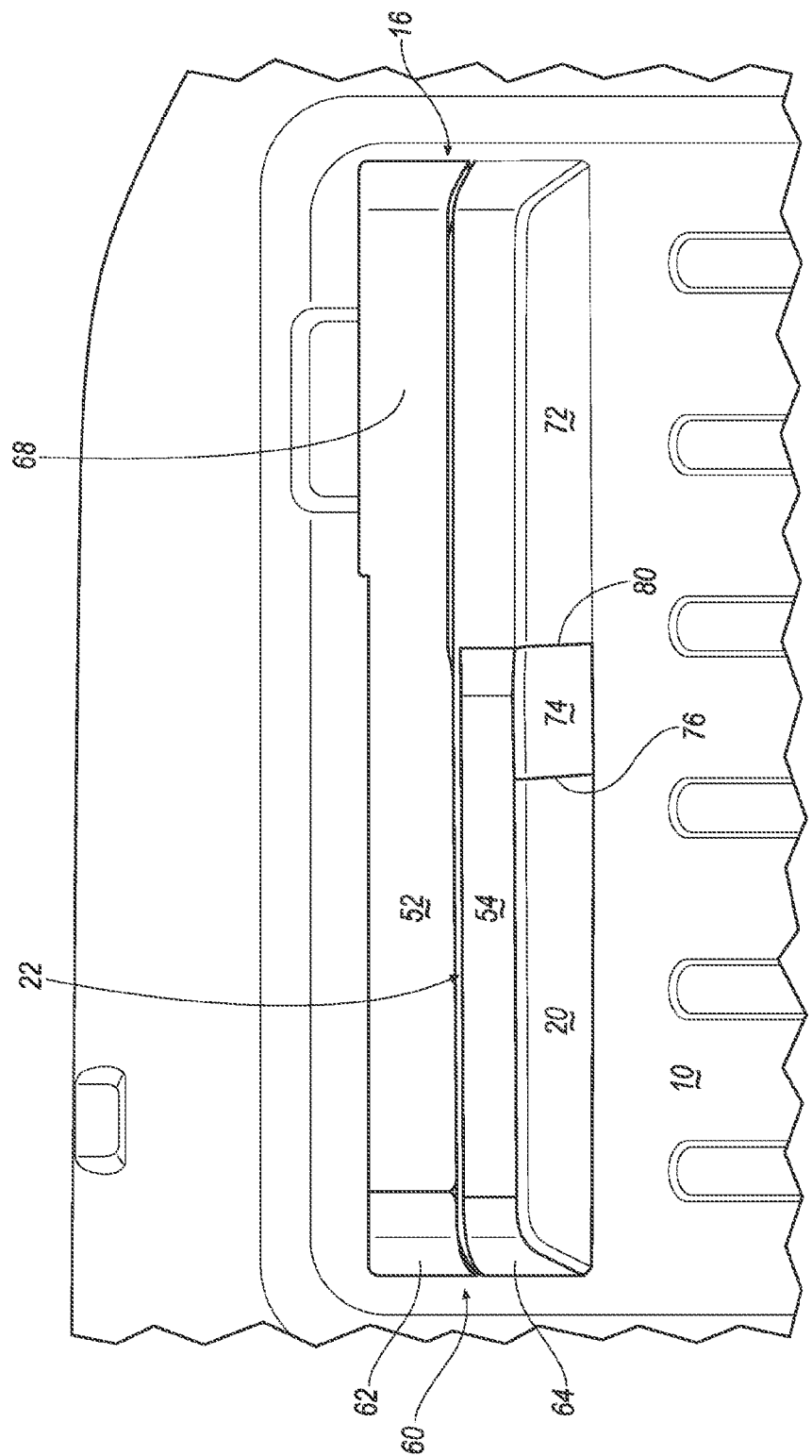
FIG. 4 is a front view of a portion of the door trim panel assembly.

With reference to FIGS. 3 and 4, the middle portion 22 may include the first part 52 of the middle portion 22 and the second part 54 of the middle portion 22. Specifically, the upper segment 40 may include the first part 52 of the middle portion 22, and the lower segment 38 may include the second part 54 of the middle portion 22. The first part 52 of the middle portion 22 may be integral with the top portion 18, and the second part 54 of the middle portion 22 may be integral with the bottom portion 20. As set forth above, the wall thickness 56 of the first part is greater than the wall thickness 58 of the second part 54 of the middle portion 22.

As shown in FIG. 4, the door trim panel 10 may include a side portion 60 that extends from the top portion 18 to the bottom portion 20. The side portion 60 is thinner than the top portion 18, the bottom portion 20, and the middle portion 22. The side portion 60 may extend from the middle portion 22 to the door trim panel 10. The side portion 60 may facilitate energy absorption by the armrest 16 by guiding, e.g., orienting, the compression of the top portion 18, the bottom portion 20, and the middle portion 22, as described later and as shown in FIGS. 5A-C and FIGS. 6A-C.

The side portion 60 includes a first part 62 of the side portion 60 and a second part 64 of the side portion 60. Specifically, the upper segment 40 may include the first part 62 of the side portion 60 and the lower segment 38 may include the second part 64 of the side portion 60. The first part 62 of the side portion 60 may be integral with the top portion 18, and the second part 64 of the side portion 60 may be integral with the bottom portion 20. The first part 62 of the side portion 60 may be thinner than the second part 64 of the side portion 60.

As set forth above, the first part 52 of the middle portion 22, the first part 62 of the side portion 60, the second part 54 of the middle portion 22, and the second part 64 of the side portion 60 may each have different wall thickness. Specifically, as set forth above, the first part 54 of the middle portion 22 may be thicker than the second part 54 of the middle portion 22 and/or the first part 62 of the side portion 60 may be thinner than the second part 64 of the side portion 60, as shown in FIGS. 3-4. For example, the first part 52 of the middle portion 22 may have a wall thickness of 2.10-2.50 mm, e.g., 2.30 mm, the second part 54 of the middle portion 22 may have a wall thickness of 1.80-2.20 mm, e.g., 2.00 mm, the first part 62 of the side portion 60 may have a wall thickness, of 1.30-1.70 mm, e.g., 1.50 mm, and the second part 64 of the side portion 60 may have a wall thickness of 1.55-1.95 mm, e.g., 1.75 mm.

The relative wall thickness of each of the first part 52 of the middle portion 22, the second part 54 of the middle portion 22, the first part 62 of the side portion 60, and the second part 64 of the side portion 60 compared with each other and with the rest of the armrest 16 may determine the energy absorption capability of the armrest 16. Designing the wall thickness of any of the first part 52 of the middle portion 22, the second part 54 of the middle portion 22, the first part 62 of the side portion 60, and the second part 64 of the side portion 60 may alter the compressibility of the armrest 16.

As shown in FIG. 2 and FIGS. 6A-C, the door trim panel 10 may include a foam body 66 supported by the door trim panel 10 and disposed below the bottom portion 20. The foam body 66 may receive energy from the bottom portion 20 and/or the door trim panel 10. The foam body 66 may compress to absorb the energy from the impact force. For example, the foam body 66 may compress after the compression of the top portion 18, the bottom portion 20, the middle portion 22, and/or the side portion 60 to absorb and/or transfer the energy from the impact force and not absorbed by the armrest 16.

The foam body 66 may extend in a direction from the door trim panel 10 toward the door panel 32. The foam body 66 may be configured to engage specific surfaces, e.g., a surface of the door panel 32. The foam body 66 may be formed of any one or more suitable materials, e.g. any suitable variation of foam.

The foam body 66 may be of any shape. For example, the foam body 66 may taper, i.e., gradually lessen in size, toward the side portion 60, as shown in FIG. 2. The shape of the foam body 66 may facilitate energy absorption. The shape of the foam body 66 may facilitate adherence to packaging constraints, i.e., space restrictions imposed by design.

As shown in FIG. 3, the door trim panel 10 may include a finger well portion 68 that may be defined in the upper segment 40 of the armrest 16. Specifically, as shown in FIGS. 2-3 and FIGS. 5A-C, the finger well portion 68 may be adjacent the top portion 18. The finger well portion 68 may be integral with the top portion 18 or may be mounted to the door trim panel 10. The finger well portion 68 may include a finger well 70 that has a downward concavity or that may be of any suitable shape.

The lower segment 38 of the armrest 16 may include a support portion 72 for receiving the finger well portion 68. The support portion 72 may extend from the door trim panel 10 toward the occupant 30 of the vehicle 12 as shown in FIGS. 5A-C, e.g., the support portion 72 may extend from the door trim panel 10 at a perpendicular angle. The support portion 72 may be integral with the door trim panel 10. The support portion 72 may be made of any suitable material having any suitable wall thickness. The support portion 72 may include holes that receive heat stakes for fastening to the finger well portion 68, as shown in FIG. 2. Alternatively, the support portion 72 may be fixed to the finger well portion 68 by any suitable manner, e.g., snap-on, bolt, adhesive, etc. Additionally, the support portion 72 may be fixed to the finger well portion 68 by the fastening of the bottom portion 20 to the top portion 18 and/or middle portion 22. Once fixed, the support portion 72 may align, i.e., form a substantially straight side, with the bottom portion 20 and/or with a transition portion 74, described below.

As shown in FIG. 4, the armrest 16, and specifically the lower segment 38, may include the transition portion 74 between the bottom portion 20 and the support portion 72. The transition portion 74 may extend from the bottom portion 20 to the support portion 72. Wall thickness of the transition portion 74 may vary along the length of the transition portion 74. For example, the transition portion 74 may have a first wall thickness equal to the wall thickness 24 of the bottom portion 20 at a first intersection 76 of the bottom portion 20 and the transition portion 74. Additionally, the transition portion 74 may have a second wall thickness equal to the wall thickness 78 of the support portion 72 at a second intersection 80 of the transition portion 74 with the support portion 72. Intermediate wall thickness, i.e., wall thickness with magnitude between the magnitude of the first wall thickness and the second wall thickness, may exist between the first intersection 76 and the second intersection 80 such that the transition portion 74 gradually thickens as it extends from one terminus of the transition portion 74 to the other terminus of the transition portion 74.

The armrest 16 may include a divider 82 extending from the door trim panel 10 to the lower segment 38 of the armrest 16. Specifically, the divider 82 may extend from the door trim panel 10 to the support portion 72 and/or the transition portion 74. The divider 82 may be a cross-beam or other suitable structure. The divider 82 may extend from the door trim panel 10 at a substantially perpendicular angle or may extend from the door trim panel 10 at any suitable angle. The divider 82 may support the armrest 16, may be of any suitable wall thickness, may be made of any suitable material, and/or may be integral with the door trim panel 10.

The divider 82 may separate the finger well portion 68 and the support portion 72 from the rest of the armrest 16. The finger well portion 68 and the support portion 72 may be configured to compress to a lesser extent than the rest of the armrest 16, e.g., the top portion 16, the bottom portion 20, the middle portion 22, and the side portion 60, as the finger well portion 68 and the support portion 72 may include vehicle structures, e.g., the finger well 70 or components of a door handle such as an actuator or lever, for which an objective may not be to absorb energy from the impact force. The divider 82 may direct the absorption of the impact force from the finger well portion 68 and the support portion 72 toward the rest of the armrest 16, e.g., the top portion 18, the bottom portion 20, the middle portion 22, and the side portion 60.

As shown in FIG. 2, the door trim panel 10 may include a reinforcing bracket 84 that extends from the armrest 16. The reinforcing bracket 84 may engage the door panel 32, e.g., the door inner of the door panel. The reinforcing bracket 84 may reinforce the armrest 16. For example, the reinforcing bracket 84 may aid in transmitting a pulling force applied by the occupant 30 of the vehicle 12 to the armrest 16 to pull the door to a closed position. The reinforcing bracket 84 may be formed of metal or of any suitable material.

The reinforcing bracket 84, for example, may extend along and reinforce the finger well portion 68. The finger well portion 68 may be supported by the reinforcing bracket 84. The finger well portion 68 may engage the reinforcing bracket 84 and the reinforcing bracket 84 may connect, e.g., bridge, the finger well 70 to the door trim panel 10. The reinforcing bracket 84 may engage the finger well portion 68 in any suitable manner and/or the reinforcing bracket 84 may connect to, e.g., fasten to, the support portion 72 in any suitable manner.

By engaging the finger well portion 68 and/or the support portion 72, the reinforcing bracket 84 may function to direct energy received and generated by the operation of the finger well portion 68, e.g., opening and closing the door, away from the rest of the armrest, e.g., the top portion 18, the bottom portion 20, the middle portion 22, and the side portion 60.

Figure 6A:
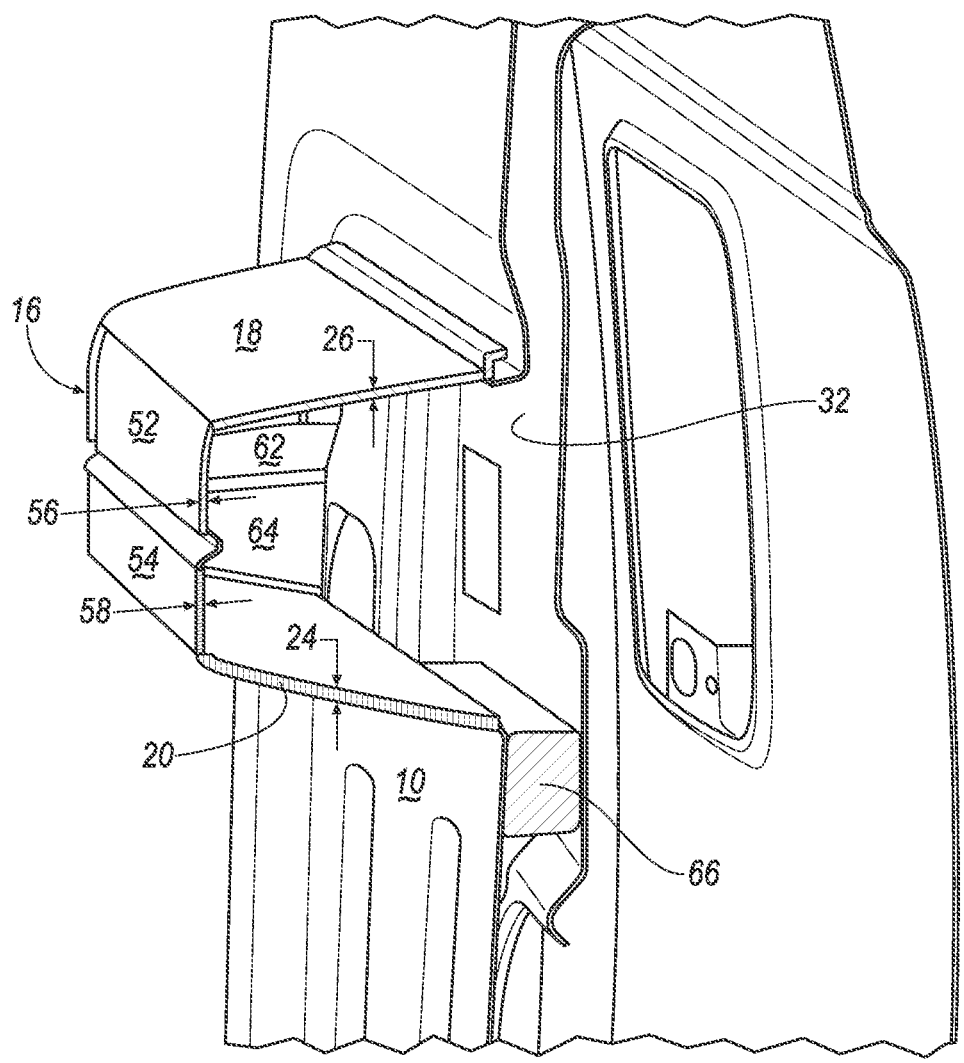
FIG. 6A is a cross-sectional view of FIG. 5A.

As shown in FIGS. 5A-C and FIGS. 6A-C, the armrest 16 deforms to absorb the energy created by the occupant 30 impacting the armrest 16. In FIG. 5A and FIG. 6A, the occupant 30 has not impacted the armrest 16 and the armrest 16 is intact. When the occupant 30 impacts the armrest 16 at a point where the pelvic area 34 of the occupant 30 impacts the door trim panel 10, the middle portion 22 and/or the side portion 60 may initially receive the impact force and begins to compress to absorb the energy. The wall thickness of the side portion 60 relative to the wall thickness of the portions of the rest of the armrest 16 allows the side portion 60 to absorb a portion of the impact force, while guiding the compression of the rest of the armrest 16. The middle portion 22 compresses to absorb a portion of the impact force and may transfer the energy created by the impact force to the bottom portion 20 and to the top portion 18. The bottom portion 20, the side portion 60, and/or the top portion 18 may subsequently transfer the energy to the door trim panel 10, which may subsequently transfer the energy to the foam body 66 that may absorb energy that is not absorbed by the armrest 16.

Figure 6B:
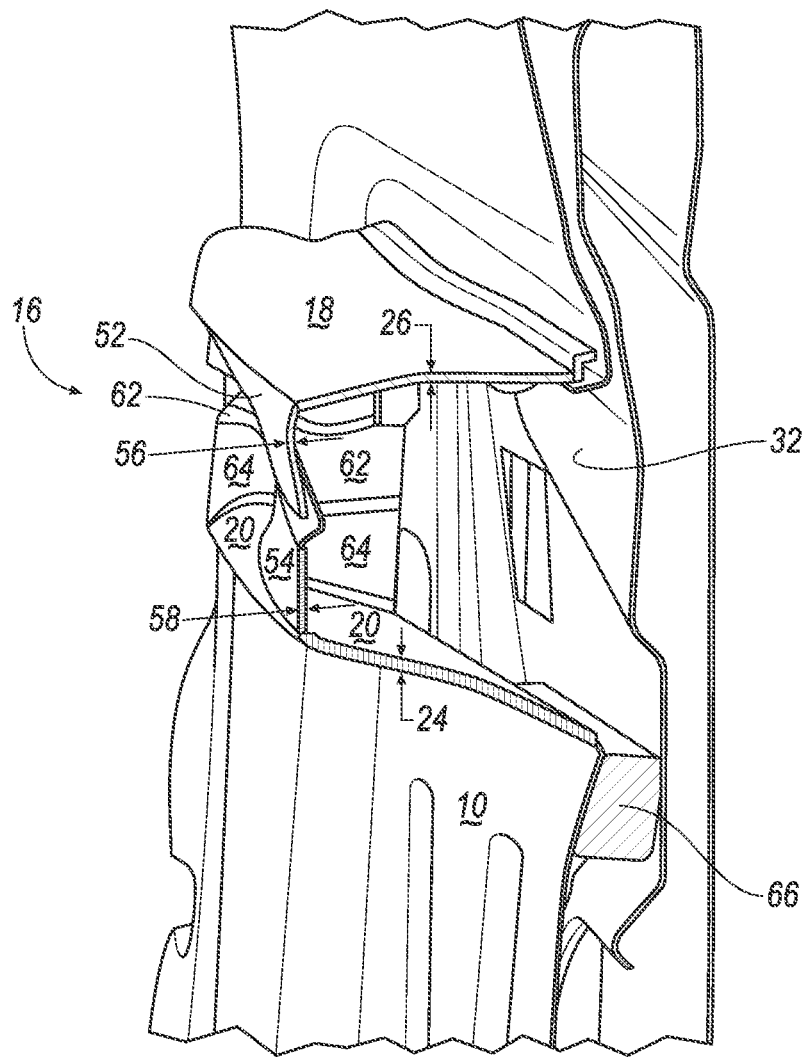
FIG. 6B is a cross-sectional view of FIG. 5B.

With reference to FIGS. 5B and 6B, the armrest 16 is immediately deformed in response to the impact force. As shown, the middle portion 22 may curve inward toward the door trim panel 10 and the bottom portion 20, the top portion 18, and the side portion 60 may deform to compensate for the inward curve of the middle portion 22.

Figure 6C:
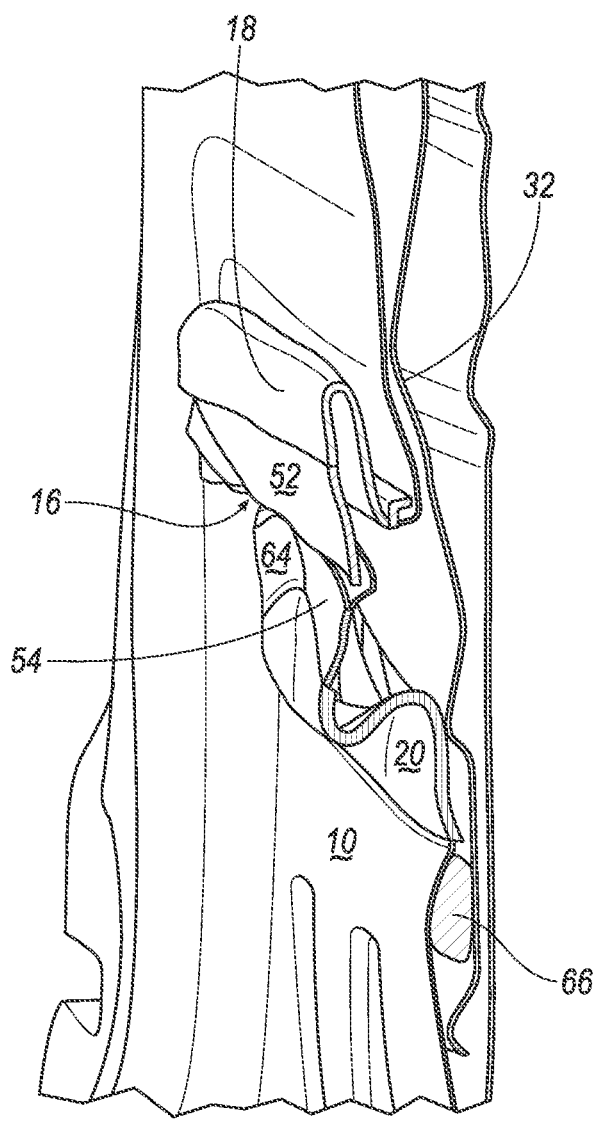
FIG. 6C is a cross-sectional view of FIG. 5C.

With reference to FIG. 5C and FIG. 6C, the armrest 16 is fully deformed. As shown, the middle portion 22 may curve inward toward the door trim panel 10 and the top portion 18 and the bottom portion 20 and the side portion 60 may deform to compensate for the inward curve of the middle portion 22. The bottom portion 20 may deform more than the top portion 18, as the bottom portion 20 may receive more energy from the middle portion 22. Because the bottom portion 20 is thicker than the portions of the rest of the armrest 16, e.g., the top portion 18, the middle portion 22, and the side portion 60, the energy is focused thereon, and the compression of the bottom portion 20 absorbs a large amount of the total energy transferred by the occupant 30. As best shown in FIG. 6C, the foam body 66 may compress to absorb energy that is not absorbed by the armrest 16 and/or from the door trim panel 10.

Additionally, because the bottom portion 20 may be opposite the pelvic area 34 of the occupant 30, the bottom portion 20 prevents the pelvic area 34 of the occupant 30 from impacting other vehicle components, e.g., the door trim panel 10, etc., that may be less capable of absorbing energy.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A door trim panel assembly comprising:
a door trim panel; and
an armrest supported by the door trim panel;
the armrest including a top portion and a bottom portion each extending from the door trim panel, and a middle portion extending from the top portion to the bottom portion;
wherein the bottom portion has a wall thickness greater than a wall thickness of the top portion and greater than a wall thickness of the middle portion, and wherein the wall thickness of the top portion is less than the wall thickness of the middle portion.

2. The door trim panel assembly as set forth in claim 1 wherein the middle portion includes a first part and a second part, the first part being integral with the top portion and the second part of the middle portion being integral with the bottom portion.

3. The door trim panel assembly as set forth in claim 2 wherein the first part is thicker than the second part.

4. The door trim panel assembly as set forth in claim 1 further comprising a side portion extending from the top portion to the bottom portion, the side portion being thinner than the top portion and the bottom portion and the middle portion.

5. The door trim panel assembly as set forth in claim 4 wherein the side portion includes a first part and a second part, the first part being integral with the top portion and the second part being integral with the bottom portion.

6. The door trim panel assembly as set forth in claim 5 wherein the first part is thinner than the second part.

7. The door trim panel assembly as set forth in claim 1 wherein the bottom portion is integral with the door trim panel.

8. The door trim panel assembly as set forth in claim 1 wherein the armrest includes an upper segment presenting the top portion, and a lower segment presenting the bottom portion, the lower segment being integral with the panel, and the upper segment being fixed to at least one of the lower segment and the door trim panel.

9. The door trim panel assembly as set forth in claim 8 further comprising shelves extending from the door trim panel and supporting the upper segment.

10. The door trim panel assembly as set forth in claim 1 wherein the top portion is made of 10% talc filled polypropylene.

11. The door trim panel assembly as set forth in claim 1 further comprising a foam body supported by the door trim panel and disposed below the bottom portion.

12. The door trim panel assembly as set forth in claim 11 wherein the foam body tapers toward the side portion.

13. The door trim panel assembly as set forth in claim 1 further comprising a reinforcing bracket extending from the armrest.

14. The door trim panel assembly as set forth in claim 13 further comprising a finger well portion adjacent the top portion and supported by the reinforcing bracket.

15. The door trim panel assembly as set forth in claim 14 wherein the finger well portion is integral with the top portion.

* * * * *